United States Patent [19]
Grimshaw et al.

[11] Patent Number: 5,314,563
[45] Date of Patent: May 24, 1994

[54] TAPE LAYING AND COMPACTION APPARATUS

[75] Inventors: Michael N. Grimshaw; David A. Peterson, both of Milford, Ohio

[73] Assignee: Cincinnati Milacron Inc., Cincinnati, Ohio

[21] Appl. No.: 126,287

[22] Filed: Sep. 23, 1993

Related U.S. Application Data

[63] Continuation-in-part of Ser. No. 68,008, May 27, 1993.

[51] Int. Cl.$^5$ ............................................. B32B 31/00
[52] U.S. Cl. ................................. 156/358; 156/523; 156/493; 156/574
[58] Field of Search ............... 156/361, 411, 412, 413, 156/523, 574, 493, 358; 492/4, 5, 40

[56] References Cited

U.S. PATENT DOCUMENTS

| | | | |
|---|---|---|---|
| 4,557,783 | 12/1985 | Grone et al. | 156/257 |
| 4,915,771 | 4/1990 | O'Brien et al. | 156/574 |
| 4,954,204 | 9/1990 | Grimshaw | 156/361 |
| 5,011,563 | 4/1991 | Shinno et al. | 156/358 X |
| 5,058,497 | 10/1991 | Bishop et al. | 29/125 X |

OTHER PUBLICATIONS

Pneutronics VIP-FLEX, Pressure Control Unit, two pages, copyright 1990. LKI Pneutronics Corp., 26 Clinton Drive, Unit 103 Hollis, N.H. 03049.

*Primary Examiner*—David A. Simmons
*Assistant Examiner*—James J. Engel, Jr.
*Attorney, Agent, or Firm*—Thomas M. Farrell; Donald Dunn

[57] ABSTRACT

An improved tape laying machine for depositing and compacting composite plastic tape onto a work surface, for producing a plastic article, has a presser shoe member for applying and compacting a strip of composite plastic tape onto a work surface, and a tail compaction member for compacting the tail of the strip of composite plastic tape that are independently actuated, coordinately movable and linked to each other. The tail compaction member has a roller that engages the strip of tape substantially rearward of the point where the centerline of the presser shoe member intersects the compacted tape applied to the work surface as the presser shoe member is in compaction engagement with the tape. The tail compaction member roller then moves along a straight line path on the tape as the presser shoe member progressively retracts from compaction engagement with the composite plastic tape.

12 Claims, 11 Drawing Sheets

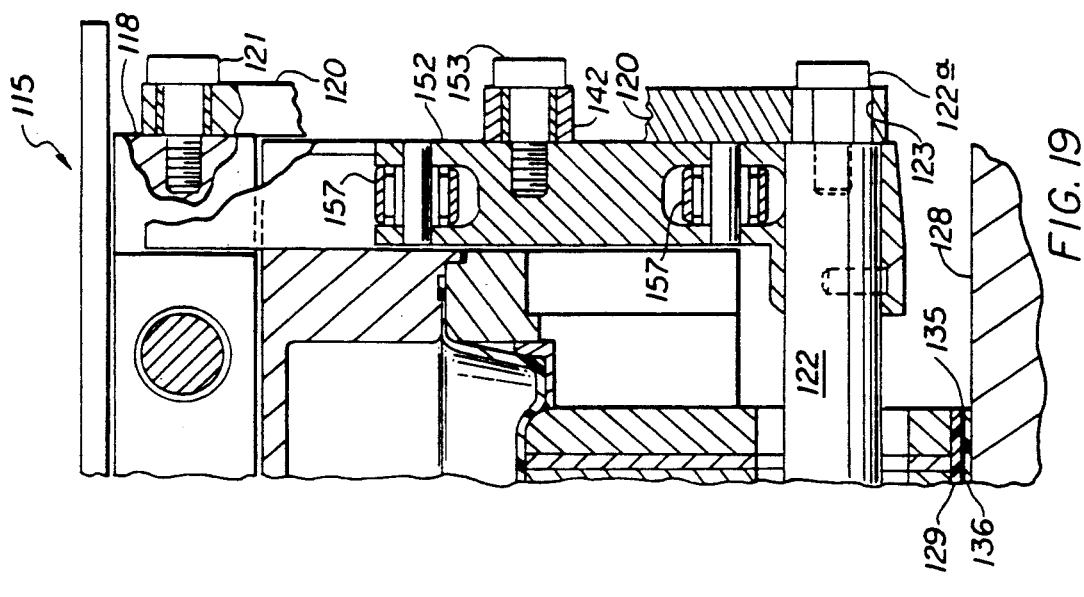
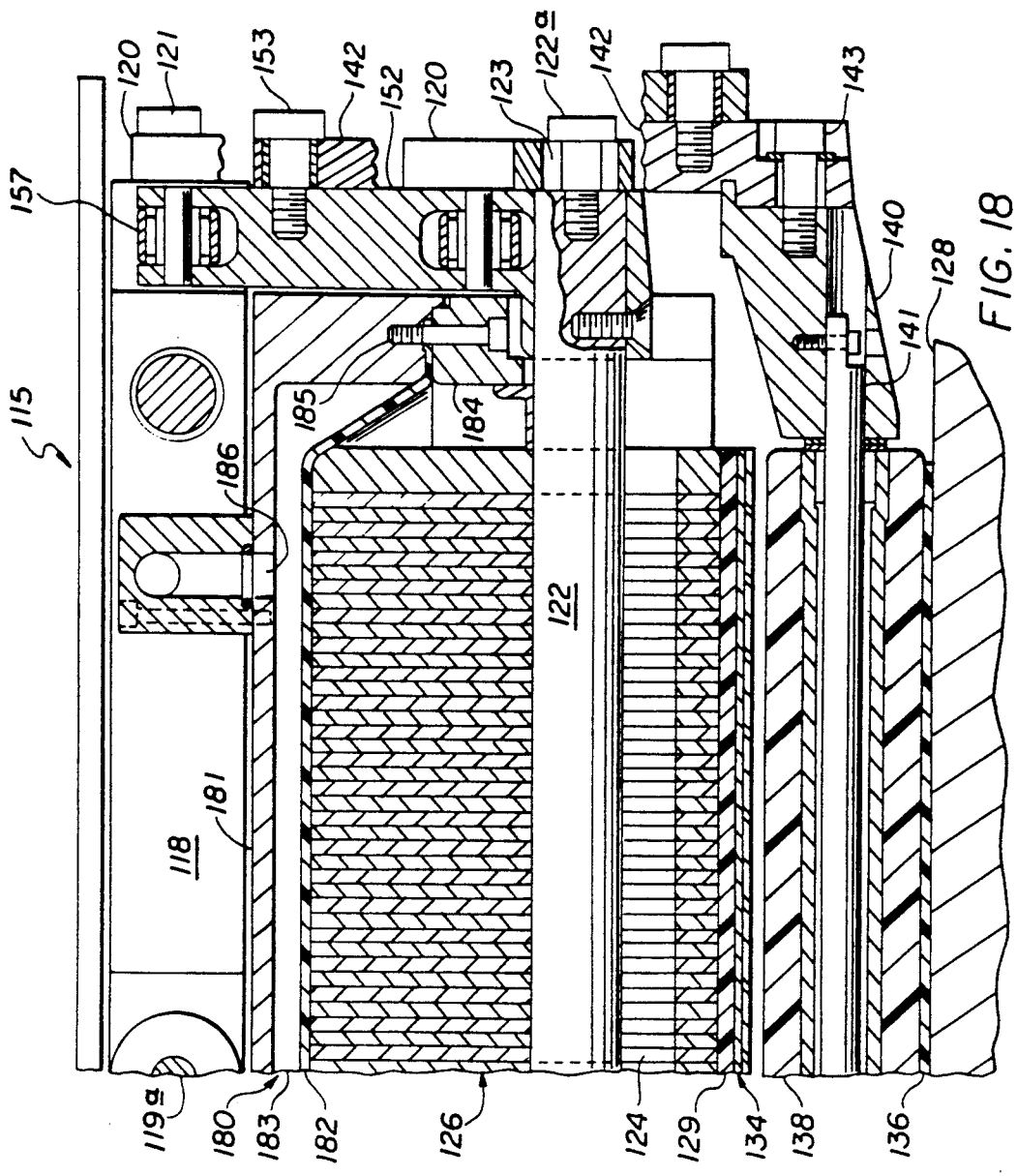

TAPE LAYING AND COMPACTION APPARATUS

This is a continuation-in-part of copending application Ser. No. 08/068008, filed May 27, 1993.

FIELD OF THE INVENTION

This invention relates to machines for laying and compacting composite tape, especially where compacting tape tails, i.e., trailing sections of tape strips which are narrower than full tape width.

BACKGROUND OF THE INVENTION

In the field of advanced composites, where a composite tape of fiber reinforced resin is laid on a tool to create laminated structures such as aircraft parts, it is necessary to lay progressive runs of tape at angles other than 90° and 0° with the tool. When laying cross plies, for example at 45°, it is often necessary to cut the end of the tape strip at some angle other than 90° with the tape length, and a problem may arise when a primary compacting member spans adjacent pieces, which are carried on a backing.

PRIOR ART

U.S. Pat. No. 4,557,783, of R. J. Grone et al, issued Dec. 10, 1985, addresses the problem of tail compaction in a composite tape laying machine. The machine and compaction device are shown herein as prior art FIGS. 1, 2a, 2b, and 2c. The entire disclosure and teaching of the '783 patent is expressly incorporated herein by reference. Prior art FIG. 1 depicts a high rail gantry tape laying machine 10 wherein a tape laying head 11 is transported coordinately on horizontal side rails 12 and transverse gantry rails 13 under a program commanded by a numerical control (NC) unit 14. A contoured tape laydown surface 15, or tool, is positionable with respect to the tape laying head 11 to form laminated composite structures. The tape laying head 11 comprises, in part, a main frame 16 supporting a tape supply reel 17. The supply reel 17 carries a tape structure 18 comprising a filamentous composite tape and a paper backing. The tape structure 18 is trained under a tape compactor unit 19 and backing is accumulated on a take-up reel 20, in a manner well-known in the art. The tape laying head 11 is movable along a vertical, or Z-axis 21 to adapt to changing tool heights along the tape path, and the entire tape head 11 is rotatable around the vertical axis 21. FIG. 2a depicts a schematic of the tape laying head 11 movable in a direction "X" with respect to a tool 22. The tape laying head 11 has a supply reel 17 which feeds out a tape structure 18 comprising a composite tape 23 releasably attached to a backing 24 such as a paper strip. The tape structure 18 feeds through a cutter unit 25 and tape guide chute 26 to its lowermost position, adjacent the tool 22, where it then passes under a presser shoe or primary compactor 27 of the tape compactor unit 19. As the tape 23 is pressed against the laydown surface 28 of the tool 22, the backing 24 is separated and pulled onto the take-up reel 20 on the head 11. Since the compactor 27 will ultimately see a tape tail 29, as depicted in FIG. 2b, and since the compactor 27 presses against the backing 24 in order to force the tape 23 against the laydown surface 28, it is obvious that the following section 30, complementary to the tail 29, would also be stuck down if there were only one compactor 27. To obviate this difficulty in handling the tail 29, the prior art tape head 11 includes a tail compactor 31, which is a roller 32, carried on a pivotable bell crank 33. The bell crank 33 is swung from a pivot joint 34 on the head 11 by a cylinder 35, reacting against the head 11, to drive the tail compactor 31 against the tape 23 in the manner shown in FIG. 2c. The tail compactor 31 is located at a spot between the backing 24 and the previously laid tape 23a, so that it contacts only tape 23 when swung into the "down" position. Through linkage 36 attached from the bell crank 33 to the primary compactor 27 and to a backing guide 37, the downward stroke of the tail compactor 31 with respect to the tape laying head 11 forces the primary compactor 27 and entire tape head 11 up, away from the laydown surface 28, and the linkage 36 also moves the backing guide 37 into a position to help steer the backing 24 on its way to the take-up reel 20.

Certain features are noteworthy: Since the primary compactor is affixed to the tape head, the primary compaction force is provided by the head itself. And, since the tail compactor is thrust into position by reaction against the tape laying head, the tail compaction force is likewise provided by the head itself. Additionally, the primary and tail compactors, as depicted, are spaced from one another along a horizontal plane, and this may prohibit application of the head to certain contoured parts which deviate substantially from a flat surface, along the tape length.

U.S. Pat. No. 4,954,204, of M. N. Grimshaw, issued Sep. 4, 1990, teaches a presser member for contoured surfaces, and the entire disclosure and teaching of the '204 patent is expressly incorporated herein by reference. The '204 device is depicted herein as prior art FIGS. 3, 4, 5a, 5b, and 5c. With reference to prior art FIG. 3, the '204 patent teaches a presser member 38 which is affixed to the bottom of a tape laying head 11, as a primary compactor, but wherein the primary compaction force is obtained from an actuator 39 (see FIG. 4) within the device itself; thus the presser member elements move with respect to the tape head 11. The presser member elements comprise a shoe plate stack 40, i.e., plurality of adjacent shoe plates 41 of common cross-section (see FIG. 4), which may adapt to contours occurring across the tape strip 23. The presser member 38 is a four-bar linkage of the double-slider type, where a horizontal slider 42 is connected by a control link 43 to a vertical slider (the shoe plate stack 40). The presser member 38 has a housing 44, quarter-rounded at its lower rear surface and hollowed out to accommodate detail pieces. The top of the housing supports a centrally located air cylinder 45, having a piston rod 46 extending frontwardly, i.e., to the right of the figure. Immediately adjacent the front of the cylinder 45 is a pair of parallel guide rods 47a,b, one at each side of the assembly. The horizontal slider 42 rides on the guide rods 47a,b, and the end of the piston rod 46 is affixed to the slider 42.

FIG. 4 shows the shoe plates 41 in relation to the control link 43 and a control rod 48 which extends through the shoe plates 41. At the interior of the housing 44 is the actuator 39 for biasing the plates 41 downwardly, away from the housing 44. The actuator 39 is a closed bladder spring, where a chamber 49 is faced with a flexible membrane 50 which contacts the top edges of the shoe plates 41. Pressurized fluid is ducted into the chamber through a port 51 to load the compliant membrane 50 against the shoe plates 41.

FIG. 5a is a diagrammatic view of the elements of FIG. 3, showing the quarter-round housing 44 supporting the vertically movable shoe plate stack 40, with a latch finger 52 "up" and the slider 42 moved to the right against the latch finger 52. The control link 43 is shown connected to the control rod 48 which evens out, or "nulls" all plates at a known dimension, Z'. The downward biasing force provided by the membrane 50 is depicted as a bladder spring 53 reacting against the top edge of the shoe plates 41. The position of the elements in FIG. 5a is used for programming all vertical, or Z-axis dimensions, providing a known point from which the shoe plates 41 may float up and down. FIG. 5b depicts elements of FIG. 5a in an alternate position, where the latch finger 52 is "down" and the slider 42 is moved leftwardly to the fully-retracted position. This position of the presser member 38 is used for compacting a tape strip 23 against the tool laydown surface 28. The control link 43 has moved the horizontal control rod 48 to an intermediate position within the shoe plate slot 54; the shoe plates 41 are free to float on tool contours as the bladder spring 53 biases the entire shoe plate stack 40 against the tape 23. FIG. 5c depicts the latch finger 52 retracted, and the slider 42 now fired to the fully-advanced position, all the way to the right. The control link 43 now pulls the control rod 48 to a new raised position, thus fully-retracting the vertically-movable shoe plates 41 upwardly into the housing 44, compressing the biasing bladder spring 53. This position permits the use of auxiliary equipment, such as a tail compacting roller 55.

A machine for laying and compacting composite tape to produce a plastic article was made and sold more than one year prior to this application by Cincinnati Milacron Inc., the assignee of this application, that included a segmented shoe for laying and compacting composite tape and a tail compactor for compacting the tail end of a string or strip of composite tape placed and compacted onto a work surface (e.g., a mold) or previously laid course of composite tape. The segmented shoe and the tail compactor were not mechanically linked together for movement and were independently and coordinately controlled by the operator and/or a computer program so as to move from the segmented shoe tape compaction operation to the tail compaction operation in a somewhat controlled manner. The tail compactor assembly was provided with a fluid cylinder that moved a tail compactor roller from a stored position, out of contact with the composite tape, to a tail compaction position in contact with the tail portion of a composite tape string or strip without being mechanically linked to the segmented shoe or the separate independent mechanism for raising and lowering the segmented shoe. Coordination between the tape laying and compaction by the segmented shoe and tail compaction was achieved by the control of the machine by its operator and/or by a computer program that controlled the movement of the segmented shoe and the tail compactor. The segmented shoe contained a plurality of vertically movable parallel sided stacked plates that had a curved tape engaging end projecting from the housing in which the plates were mounted and at the other end a curved surface that engaged a flexible membrane which formed the closed side of a fluid chamber into which air or other suitable fluid could be introduced to create pressure on the membrane to bias the segmented shoe plates downward for laying and compacting composite tape onto a work surface.

SUMMARY OF THE INVENTION

It is an object of the present invention to provide a compactor assembly for composite tape wherein a main compactor is independently powered with respect to a tape laying head and combined with a tail compactor which is likewise independently powered with respect to the head.

Another object of the present invention is to provide a composite tape strip compactor assembly in which a main compactor is adaptable to contour changes occurring across the tape strip and a tail compactor is capable of tail compaction on surfaces deviating substantially from a flat plane along the tape length.

Another object of the present invention is to provide a compactor assembly for composite tape, in which a main compactor is utilized for laying essentially a full-width tape strip at a tape laydown point defined with respect to a tape laying head, and in which the main compactor is displaced by a tail compactor which may finish laying the tail of the tape strip at the tape laydown point.

Still another object of the present invention is to provide a compactor assembly for composite tape, wherein main compaction and tail compaction occur at substantially the same point with respect to the tape laying head which carries the compactor assembly.

A still further object of the present invention is to provide a compactor assembly for composite tape, wherein primary tape strip compaction and tail compaction are independent of tape laying head movement and are provided by independent, mechanically coordinated actuators, carried by the tape laying head.

Another object of the present invention is to provide a compactor assembly for composite tape, in which linkage is utilized for simultaneously switching positions of the main compactor and tail compactor with respect to a tape laydown point.

The foregoing objects are achieved by the invention which is embodied in an improved tape laying machine, having a tape head movable along a horizontal path for depositing composite tape on a tape laydown surface, where the head includes a tape structure transported to a tape laydown point, and where the head also includes a main compactor means movable with respect to the head and a tail compactor means, wherein the improvement comprises: a horizontal reference plane defined on the tape laydown surface; a housing, mounted to the tape laying head, and movable therewith relative to the reference plane; a substantially vertical centerline defined on the housing; a first slider, vertically movable on the housing; a second slider, horizontally movable on the housing; means for moving the second slider in forward and reverse directions; main compactor means movably mounted on the housing along the vertical centerline, for compacting the tape with respect to the tape laydown point defined on the horizontal reference plane; means for biasing the main compactor means away from the housing; a first elongate link, having opposite ends, and pivotally connected at one end to the first slider about a first horizontal pivot axis; a secondary compactor, connected at the other end of the first elongate link, and positioned at a location trailing the laydown point; a second elongate link, having opposite ends, and pivotally connected at one end to the second slider about a second horizontal pivot axis; means for pivotally connecting the other end of the second elongate link to the first elongate link about a third horizontal pivot axis; means for governing movement of the first elongate link through a portion of its pivotal movement; and, lifting means on the first slider for lifting the main compactor means against the biasing means.

BRIEF DESCRIPTION OF THE DRAWINGS

FIG. 18 is an elevational section taken along line XVIII—XVIII of FIG. 17.

FIG. 19 is an elevational section taken along line XIX—XIX of FIG. 16.

DESCRIPTION OF THE INVENTION

It should be noted that certain attitudinal references are employed herein, e.g., "horizontal", "vertical", and the like. Such references are only for the convenience of the reader, and the machine structure is not so limited; those skilled in the art will appreciate that the spatial ordinates of the machine may be changed to suit a variety of tasks within the scope of the invention.

Figure 6:
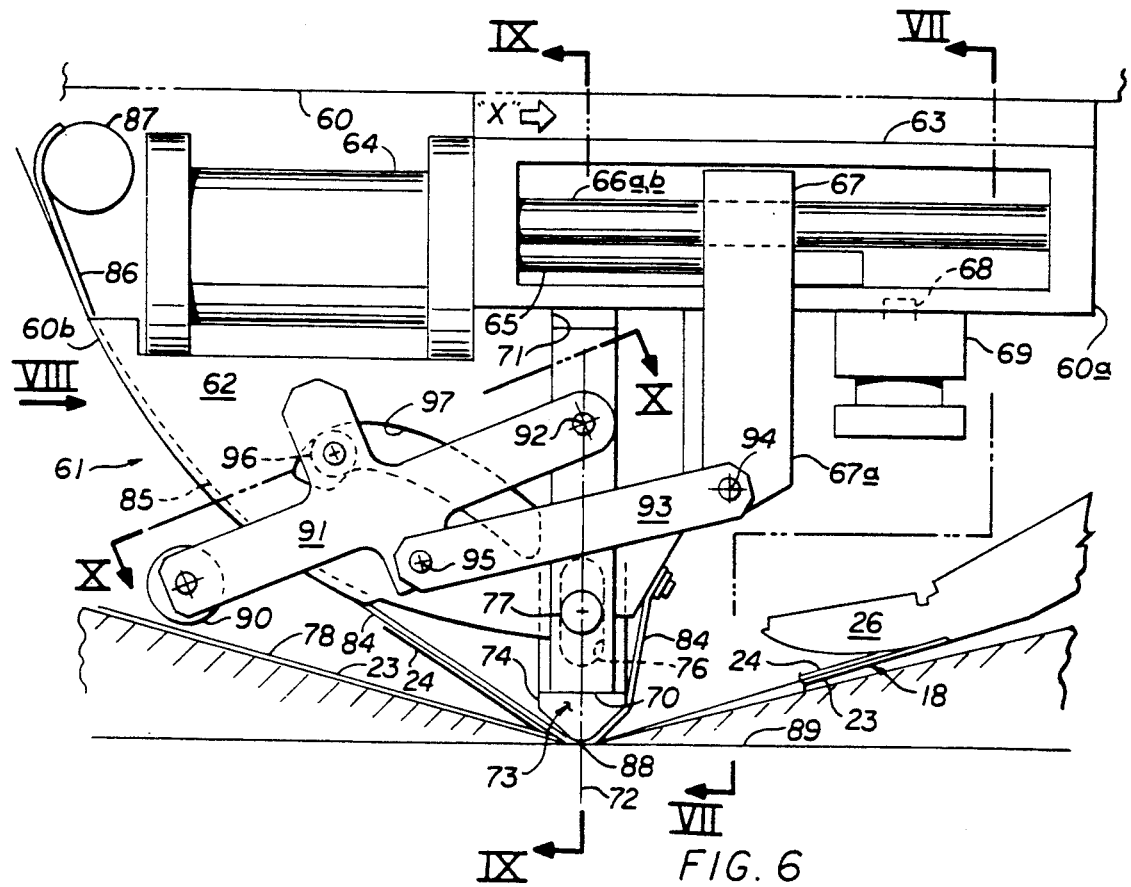
FIG. 6 is a side elevation of a tape compactor assembly.
Figure 7:
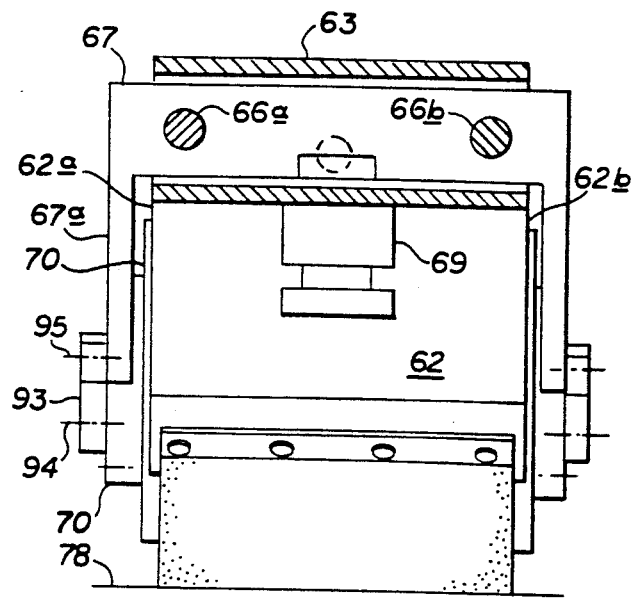
FIG. 7 is a front elevational section, taken along the line VII—VII of FIG. 6.

With reference to FIG. 6, a tape head 60 is shown with an improved tape compactor assembly 61 affixed to its bottom surface. The tape head 60 is of a type which may be used with the tape laying machine 10 of FIG. 1. The tape compactor assembly 61 will move in a forward direction "X" with the tape head 60, to the right of the figure when laying tape 23, and the head 60 thus has a front end 60a, at the right of the figure, and a rear end 60b to the left of the figure. The assembly 61 includes a housing 62 which is quarter-rounded at its lower rear surface and hollowed out to accommodate detail pieces (not shown). The top surface of the housing 62 has a frame 63 affixed thereto, which extends frontwardly. The frame 63 serves as a mounting for an air cylinder 64, which has a piston rod 65 extending frontwardly. The frame 63 also supports a pair of parallel guide rods 66a,b, one at each side of the assembly 61, and a horizontal slider 67 rides on the guide rods 66a,b and extends across the housing 62 from side-to-side (see also FIGS. 7 and 8). The slider 67 is affixed to the piston rod 65.

Figure 11A:
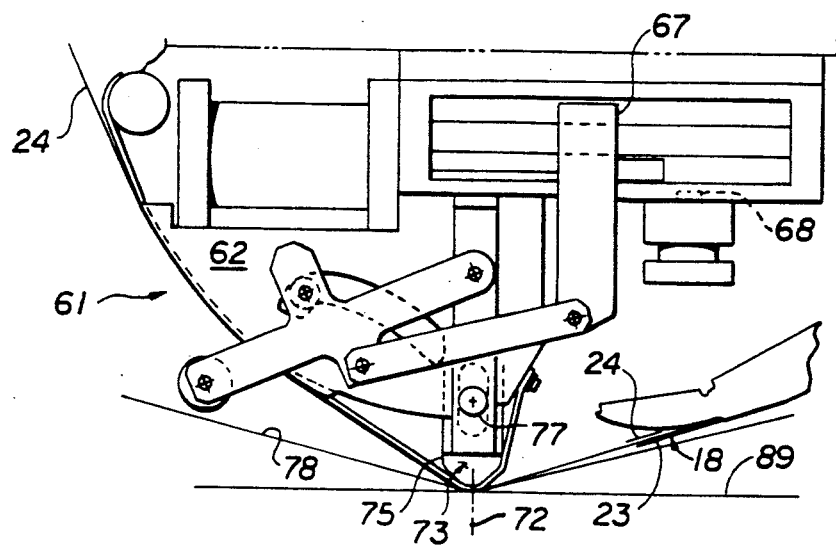
FIG. 11a, 11b, and 11c are diagrammatic views of the tape compactor assembly of FIG. 6.

The horizontal slider 67 has three specific positions:

(1) fully-retracted, as in FIGS. 6 and 11a;
(2) forwardly-advanced against a latch finger 68, as in FIG. 11b; and
(3) fully-advanced to the right with the latch finger 68 retracted, as in FIG. 11c.

Figure 9:
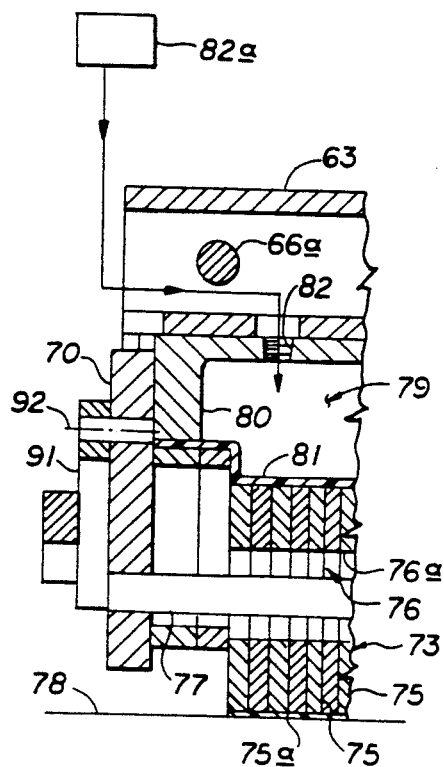
FIG. 9 is an elevational section, taken along the line IX—IX of FIG. 6.
Figure 11B:
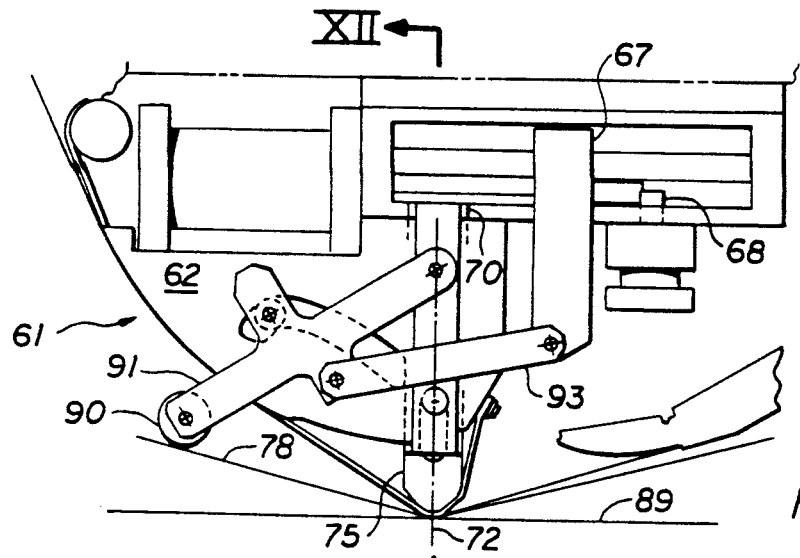
Figure 13:
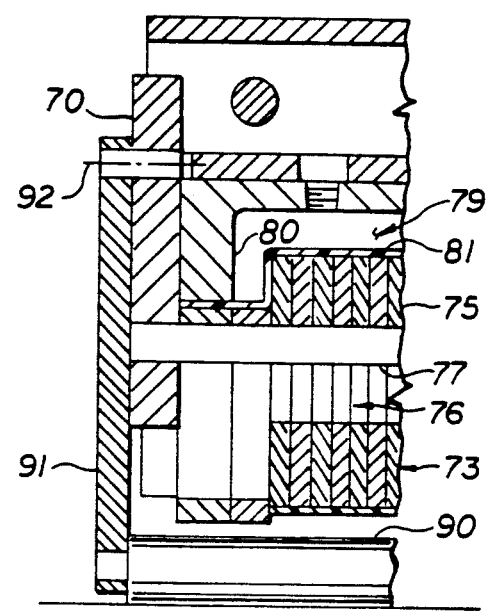
FIG. 13 is an elevational section, taken along the line XIII—XIII of FIG. 11c.

The latch finger 68 is powered in vertical directions by a compact fluid cylinder unit 69 secured to the bottom of the frame 63. Each side of the housing 62a,b has a vertical slider 70, constrained to move within a vertical track 71 along a vertical centerline 72 defined on the housing 62. Within the housing 62, immediately behind the vertical slider 70, is a main compactor 73. As shown in FIG. 9, the main compactor 73 comprises a shoe plate stack 74 for contacting the backing 24 of a tape structure 18. The shoe plate stack 74 is a plurality of parallel, wafer-like shoe plates 75 guided for vertical movement with respect to one another within the housing 62. A vertical elongate slot 76 of common size is provided in line through all of the plates 75, and a control rod 77 extends horizontally, from side to side through all of the slots 76 and is affixed to the vertical sliders 70. In the position shown in FIGS. 6, 9, and 11a, the control rod 77 is positioned approximately mid-way along the vertical slot 76 so it will not interfere with compactor movement which may require the shoe plates 75 to adapt to a variety of contours across the tape width. This is the normal tape laying position. When it is desired to land the compactor 73 and tape 23 on a work surface 78, at the beginning of a tape laying run, the horizontal slider 67 is stopped against the latch finger 68 as depicted in FIG. 11b. In this position, the upper edges 76a of the slots 76 will rest on the raised control rod 77, causing the bottom edges 75a of the shoe plates 75 to be in line as shown in FIG. 13. This position is an alignment, or "null" position, setting the bottom edges 75a of the plates 75 at a known relationship to the machine coordinates, for programming purposes.

In order to provide a downward biasing force to all of the plates 75, a bladder spring 79 has been devised, in the manner of U.S. Pat. No. 4,954,204, wherein the housing 62 has a closed chamber 80 formed immediately above the shoe plate stack 74. The chamber 80 includes a flexible membrane 81 extending across the shoe plates 75, in contact with and spanning the top edges 75b. The chamber 80 is provided with an orifice 82 so that air or other fluid medium may be introduced into the chamber 80 and, thus, pressurize the membrane 81 to provide a downward biasing force to the entire stack of plates 75. The membrane 81 is yieldable, to accommodate surface contour variances which will cause the plates 75 to shift vertically, relative to one another, as the tape 23 is laid.

In the preferred embodiment, the air valve unit 82a employed to pressurize the bladder spring 79 produces a pressure output which varies in proportion to the magnitude of an electrical signal. Such a valve unit is the Pneutronics VIP-FLEX Pressure Control unit, available from LDI Pneutronics Corp., Hollis, N.H. 03049. Therefore, this valve unit 82a may be controlled in accordance with an NC program to vary air pressure and consequent force directed against the tape 23. As an example, compaction of full-width tape may be performed at a constant pressure. Next, unit loading on a tapered tail may be kept constant by changing the total downward force acting on the tail compaction roller; i.e., by varying air pressure in accordance with the tail profile.

It will be appreciated that in some instances, it may be desirable to supply only a fixed pressure to the bladder spring 79. It may also be desirable to supply two alternative pressures to the bladder spring 79; a first pressure for main compaction, and a second pressure for tail compaction.

With reference back to FIG. 6, a flexible sheet or skid 84 is attached to the front of the housing 62, and directed around the nose, or bottom edge 75a of the shoe plates 75 to present a smooth surface against the backing 24. It may be appreciated, however, that some embodiments may omit the skid 84. The skid 84 is guided around the quarter-round section, within a surface channel or relief 85, and is held taut by a strap 86. The strap 86 is affixed to the skid 84 and tensioned by a coiling device 87 carried on the tape laying head 60. The tape structure 18 is shown coming from the tape guide chute 26 to the tape lay-down point 88 established by the intersection of the vertical centerline 72 and a horizontal plane 89 defined on the work surface 78. At the tape laydown point 88, while the head 60 continues moving to the right, tape 23 is deposited on the work surface 78, and the backing 24 is separated from the tape 23 and pulled upwardly against the skid 84, while running to a take-up reel (not shown).

Figure 2A:
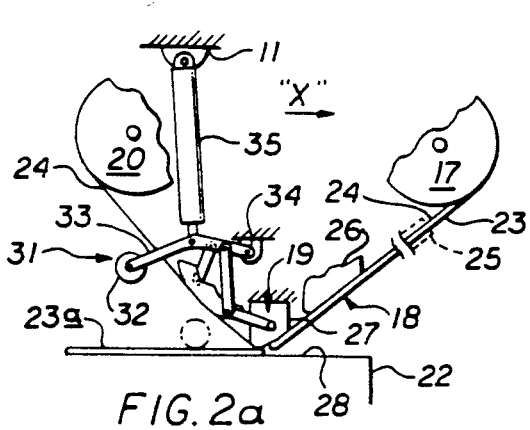
FIG. 2a is a side elevational view of a prior art compactor assembly performing a main compaction operation.
Figure 2B:
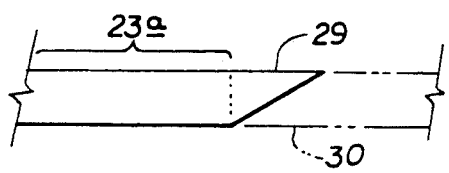
FIG. 2b is a plan view of a prior art tape strip having an angled tail.
Figure 2C:
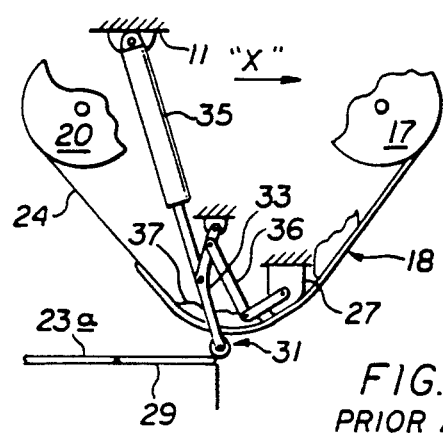
FIG. 2c is a side elevational view of the prior art compactor assembly of FIG. 2a, performing a tail compaction operation.
Figure 3:
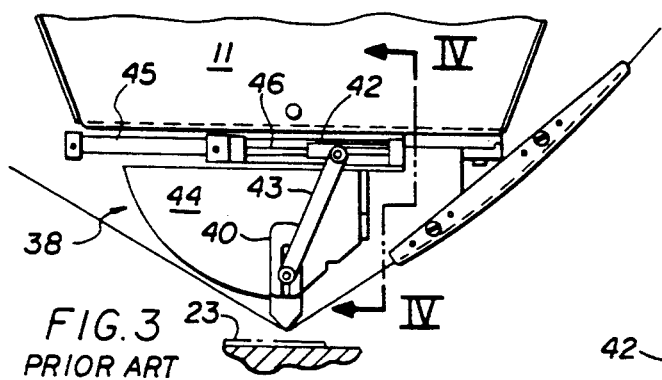
FIG. 3 is a side elevational view of a prior art compactor.
Figure 4:
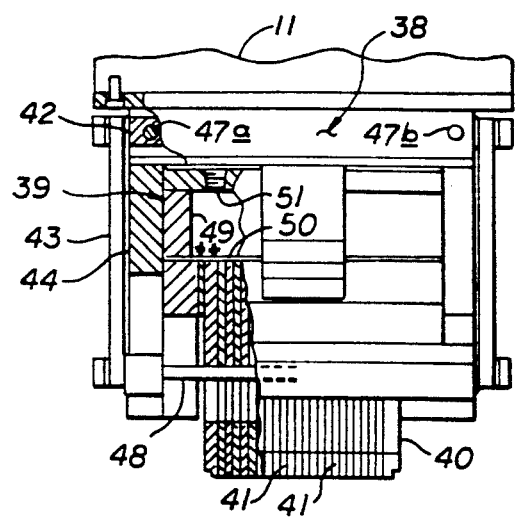
FIG. 4 is a front elevational view, in partial section, taken along the line IV—IV of FIG. 3.
Figure 5A:
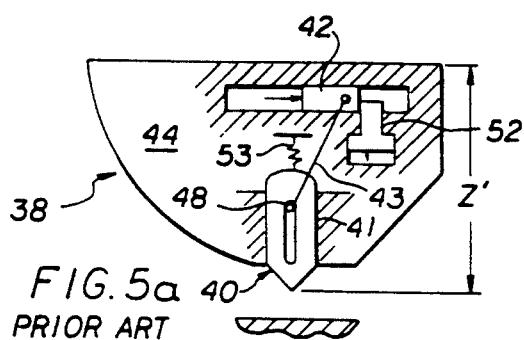
FIG. 5a, 5b, and 5c are diagrammatic views of the prior art compactor of FIG. 3.
Figure 5B:
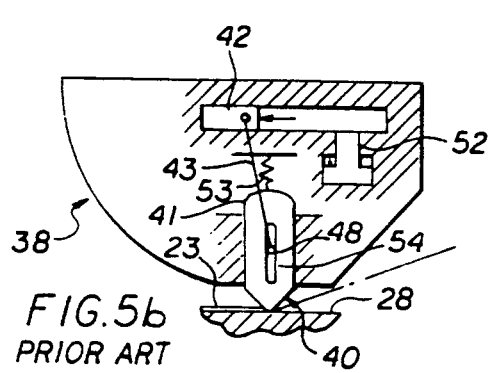
Figure 5C:
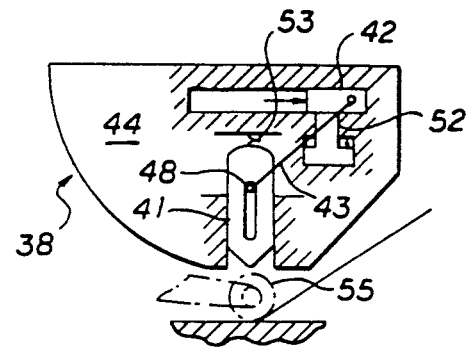

The roller 90 depicted in FIG. 6 is a tail compactor, and is located between the tape 23 and the backing 24, trailing the tape laydown point 88, in the manner taught in U.S. Pat. No. 4,557,783, prior art FIG. 2a. The roller 90 is shown in its home position, swung all the way to the left.

Figure 10:
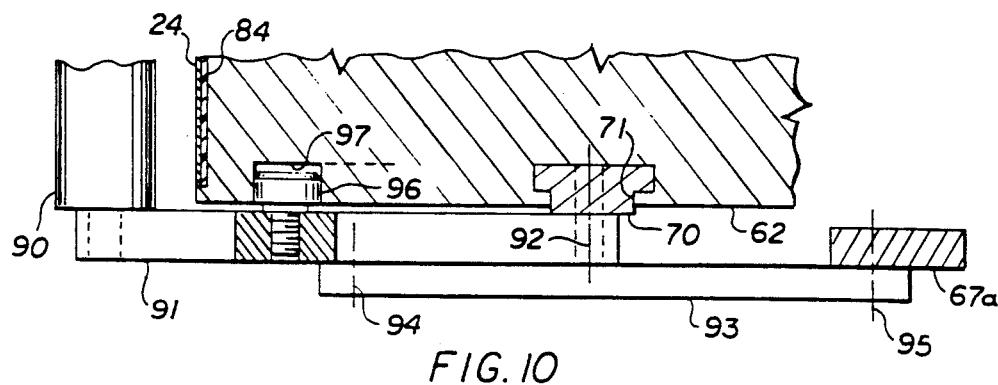
FIG. 10 is a sectional view, taken along the line X—X of FIG. 6.
Figure 8:
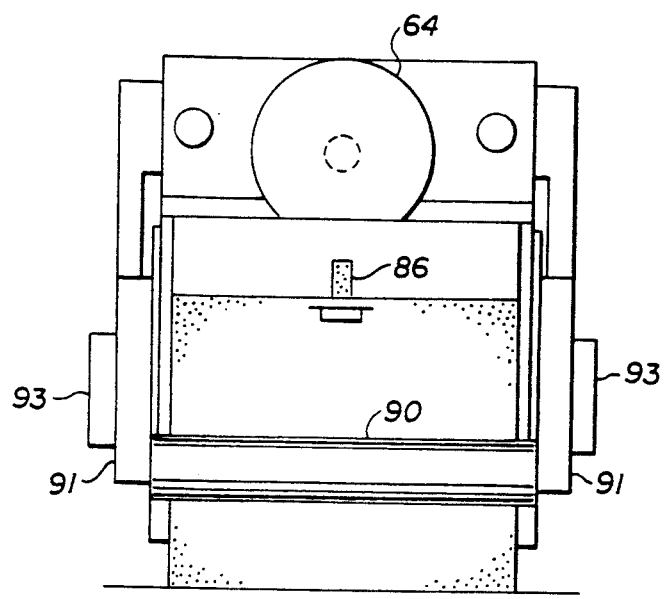
FIG. 8 is a rear view, taken in the direction of arrow VIII of FIG. 6.

A tail compactor is a secondary compactor used for compacting tape of less than full width. The roller 90 is carried at one end of a first elongate link 91, which is pivotally connected at its other end to the vertical slider 70 about a first horizontal pivot axis 92. The horizontal slider 67 has a depending section 67a at each side of the housing 62 (see FIG. 7) which extends approximately midway down the housing 62, and a second elongate link 93 is pivotally connected at one end to the horizontal slider 67 about a second horizontal pivot axis 94 while its other link end is pivotally connected to the first link 91 about a third horizontal pivot axis 95 lying approximately midway between the ends of the first link 91. The first link 91 also includes a cam follower 96 which extends horizontally from the link 91 into a cam slot 97 provided on the housing 62 (see also FIG. 10). The cam slot 97 governs the first link 91 and, consequently, movement of the tail compaction roller 90 as the horizontal slider 67 is driven by the cylinder 64. The cam slot 97 is arcuate and upwardly arched, from its initial portion, thereafter sloping downwardly towards the vertical slider 70. And, while the cam follower 96 is accurately guided within the cam slot 97 for most of the path, the end of the slot 97 is relieved, as will be described later in connection with FIG. 11c. While the first and second links 91,93 under discussion are shown on one side 62a of the housing 62, i.e., facing the viewer, it will be appreciated that there are identical links 91,93 on the opposite side 62b of the assembly 61, and the tail compaction roller 90 spans the first links 91, as shown in FIG. 8.

COMPACTOR OPERATION

Figure 11C:
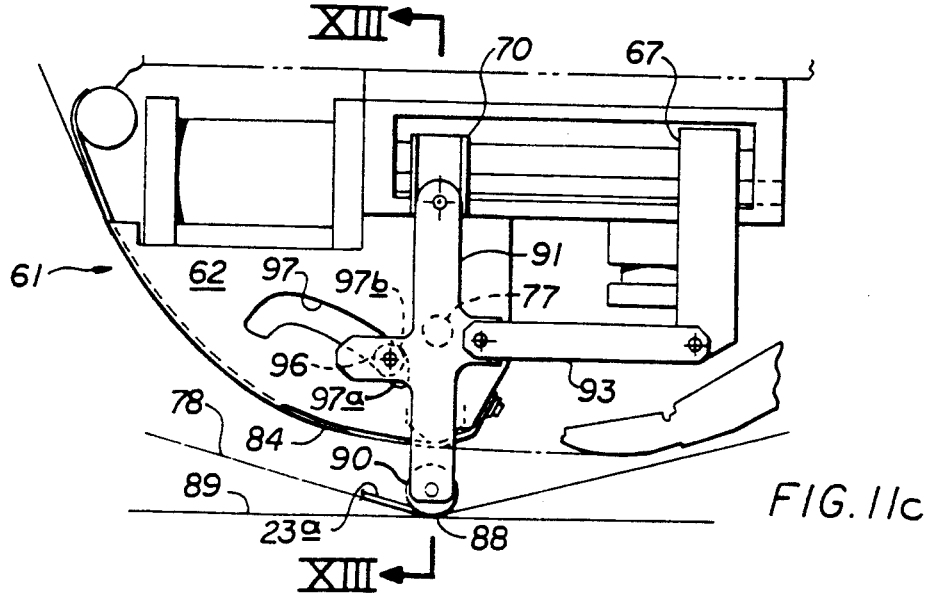

Operation of the compactor assembly 61 may be appreciated by referring to diagrammatic FIGS. 11a-11c.

FIG. 11a depicts the elements of FIG. 6, where the latch finger 68 is "down" and the slider 67 is moved leftwardly to the fully-retracted position. In this position, the main compactor 73 or shoe plate stack 74 is biased against a tape backing 24 which is being stripped from tape 23 laid to the laydown surface 78, and the position of the vertical slider 70 and its control rod 77 is such that the rod 77 will not hinder vertical float of the plates 75 (see also FIG. 9). The bladder spring 79 biases the entire shoe plate stack 74 against the backing 24 and tape 23, and the shoe plates 75 can float in compliance with contour variances occurring across the tape width.

Figure 12:
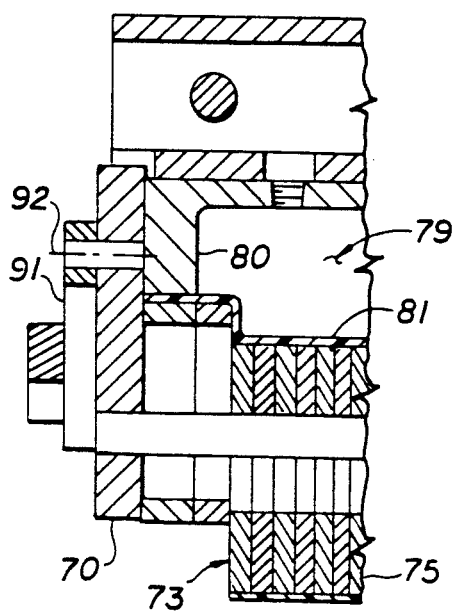
FIG. 12 is an elevational section, taken along the line XII—XII of FIG. 11b.

FIG. 11b depicts the housing 62 with the latch finger 68 "up" and the horizontal slider 67 moved to the right, against the latch finger 68. In this position, the vertical slider 70 is driven upward slightly so that its control rod 77 evens out, or "nulls" all plates 75 at a known dimension, Z' (see also FIG. 12). The position of the elements in FIG. 11b is utilized for programming all vertical, or Z-axis dimensions.

Figure 14:
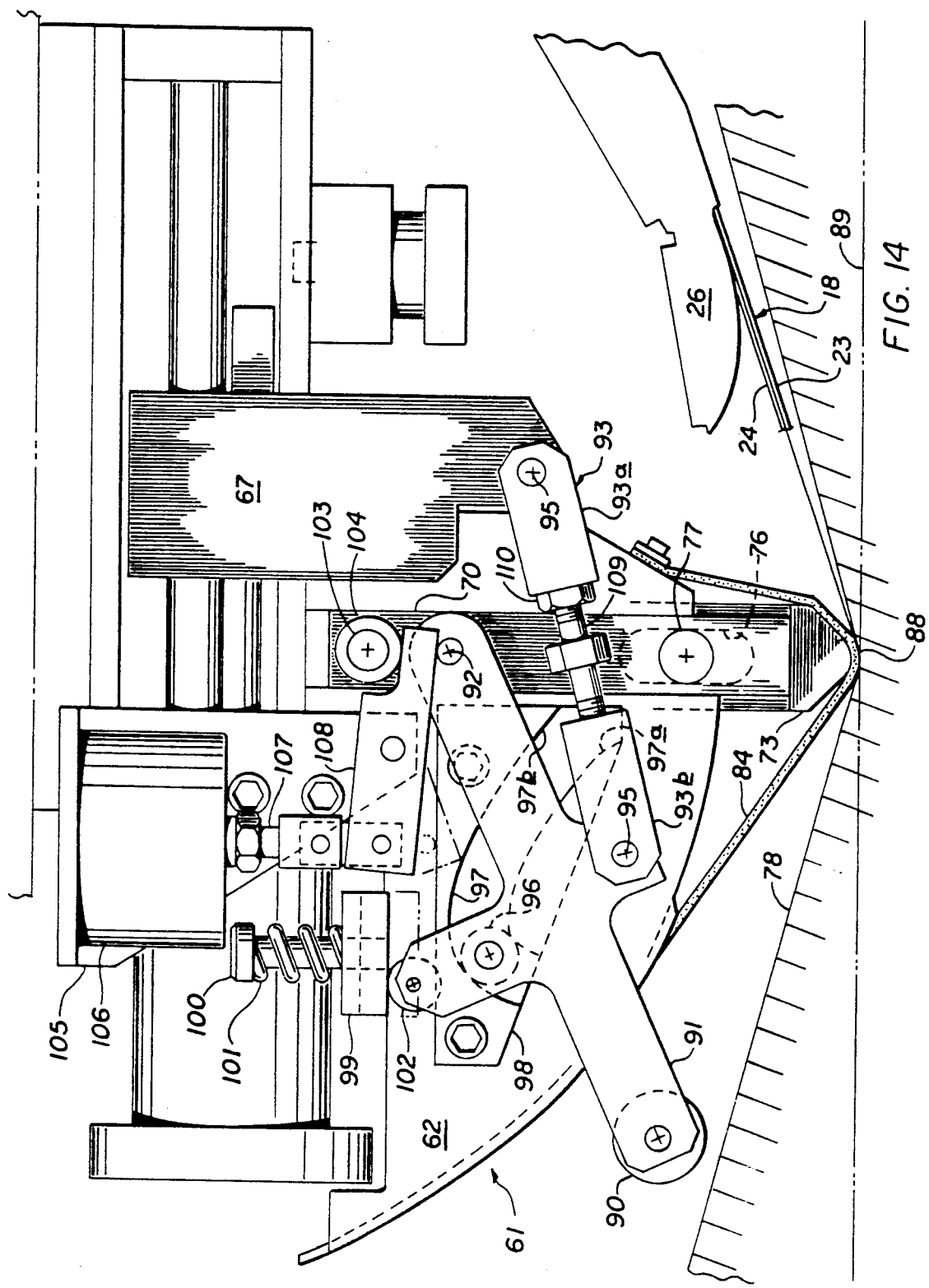
FIG. 14 is a side elevational view of a tape compactor assembly.

FIG. 11c depicts the latch finger 68 "down", and the horizontal slider 67 now fired to the fully-advanced position, all the way to the right. The vertical slider 70 is now driven to a new raised position where its control rod 77 drives the vertically-movable shoe plate stack 74 to a fully-retracted upward position into the housing 62, compressing the bladder spring 79 (see also FIG. 13). The skid 84 will follow along with the stack 74. Simultaneous with this movement of the vertical slider 70, in response to horizontal slider stroke, the first elongate link 91 is swung to a nearly vertical position, governed through most of its movement by the cam follower 96 traveling in the cam slot 97, so that the tail compaction roller 90 will be switched into the region of the tape laydown point 88, previously occupied by the now-retracted main compactor 73 (shoe plate stack 74). The linkage, coupled with guidance provided by the cam follower 96, insures that the tail compaction roller 90 will move along a path which will not interfere with the substantial slope (approximately 15°) of the work surface 78 with respect to the horizontal plane 89. With reference to FIG. 13, the tail compaction force is accomplished by the same bladder spring 79 which provides the main compactor force. The compressed bladder spring 79 attempts to drive the control rod downward along with the vertical slide 70, and the vertical slide 70 in turn, drives the first elongate link 91 and roller 90 downward against the tape tail 23a. The sides 97a,b of the cam slot 97 are slightly flared for clearance (see also FIG. 14) when the cam follower 96 is positioned as in FIG. 11c, so the first link 91 and roller 90 may move vertically against the tail 23a.

Thereafter, as the tape head 60 is lifted from the work surface 78 in anticipation of another tape laying run, the horizontal slider 67 is retracted to the left, causing the tail compaction roller 90 to swing back out to its home position, and permitting the main compactor 73 (shoe plate stack 74) to descend.

FIGS. 6-9 depict an ideal situation for the invention, where it is assumed that the vertical slide 70 will move upward easily when the horizontal slide 67 is actuated. It is further assumed that the cam follower 96 moves without shake in the cam slot 97. In actual practice, though, frictional forces are present, and the cam slot 97 at each side 62a,b, of the housing 62 is manufactured with clearance; therefore, to ensure quick action and smoothness, a practical embodiment of the invention is further developed in FIG. 14, where the following features may be seen:

1. The cam slot 97 is formed into a cam plate 98 bolted to the sides 62a,b, of the housing 62; this simplifies machining and heat treatment, as well as alignment of the right and left side elements.

2. A spring-loaded plate 99, slidable on shoulder screws 100, spans the housing 62 and is biased downwardly by springs 101 guided on the shoulder screws 100. The plate 99 contacts a roller 102 which is clevis-mounted within the first link 91, just above the cam follower 96. The spring-loaded plate 99 keeps shake out of the assembly 61 while the tail compaction roller 90 is in its home position, and provides impetus for the first portion of its advancement to the tape laydown point 88.

3. The top portion of the vertical slider 70 is provided with a horizontal stud 103 which carries an antifriction roller 104. A bracket 105 on the sides 62a,b of the housing 62 supports a helper cylinder 106. The cylinder 106 has a short-stroke piston rod 107 linked to a lever 108 pivotally-mounted to the bracket 105. The lever 108 extends under the roller 104 and serves to provide an initial lifting force for the vertical slide 70, to overcome friction as the horizontal slide 67 is actuated. Once moving, the mechanical advantage of the horizontal slide 67 over the vertical slide 70 increases, and the assist provided by the lever 108 is no longer needed. The piston rod 107, lever 108 and roller 104 are all outside of the first link 91, to avoid interference.

4. The second link 93 is comprised of two link ends 93a,b, connected by a stud 109, threadably received therein, and a locknut 110 secures the assembly once the proper dimension between the second and third pivot axes 94,95 has been established.

Those skilled in the art will appreciate that the vertical slide 70 may be provided with antifriction elements in certain applications. Similarly, provision of antifriction elements within the various slides, pivot joints and rollers herein, are deemed to be well within the ken of the machine designer.

It may be noted that, while the actuator for the main compactor 73 comprises a bladder spring 79, having a closed chamber with a membrane covering, it is also anticipated that the membrane 81 may be omitted, and fluid pressure may be applied directly against the top of the shoe plate stack 74 to bias the stack 74 in a downward direction.

It is further contemplated that a resiliently faced element may be substituted for the main compactor 73, and other devices may be substituted for the tail compaction roller 90.

Modern composite tapes, which may comprise toughened epoxy systems, are sometimes difficult to lay because of very low tack properties. One example of a low tack tape material is bismaleimide (BMI). In automatic tape laying processes, low tack tape strips may be susceptible to disturbances, e.g., forces which might tend to pull a partially laid strip away from its substrate.

Although the invention in accordance with the parent application Ser. No. 08/068008 has overcome problems associated with previous tape laying machines, particularly certain tape movement problems encountered when creating a complex contoured plastic article, and could be employed in producing substantially flat or uncontoured composite plastic tape articles, there were certain limitations of said invention with respect to the positioning of the contact point of the tail compaction roller with the tail of the tape relative to the center axis of the segmented shoe of the tape laying head. The machine according to the parent application brought the tail compaction roller into contact with the composite tape at or very near the point where the centerline of the segmented shoe meets the tape deposited on the work surface. The tape laying machine in accordance with the disclosure and claims of this invention advantageously provides adjustability in varying the point of contact of the tail compactor with the composite tape relative to the centerline of the segmented shoe in the tail compaction operation and, especially, provides for contact of the tail compactor with the composite tape at a point significantly rearward of the centerline of the segmented shoe compactor.

Figure 1:
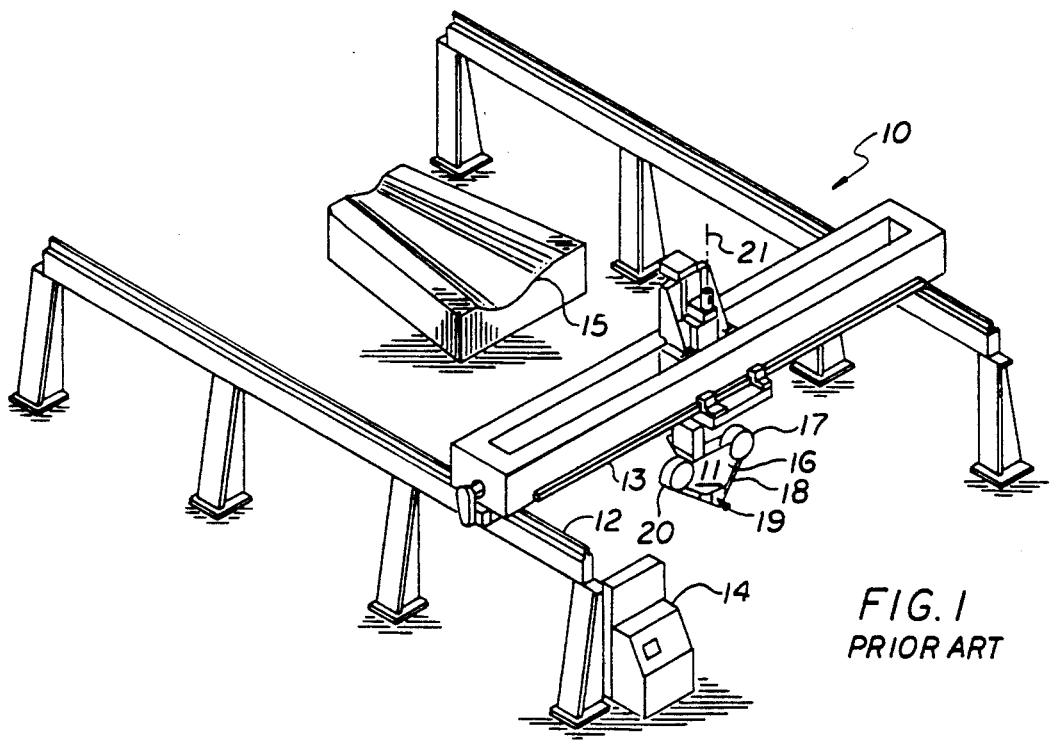
FIG. 1 is a perspective view of a prior art tape laying machine.

The improved tape laying machine, more especially the improved tape laying head of the tape laying machine in accordance with the disclosure and the appended claims for this invention will be more particularly described with reference to FIGS. 15, 16, 17, 18, and 19 and generally with reference to FIGS. 1 to 5, 7 to 9, 12 and 13 herein. A tape laying machine in terms of a more general conformation for the practice of this invention is shown in FIG. 1 and described previously herein with reference to the basic elements of a gantry type tape laying machine having rails supporting a multidirectional movable head assembly or frame carrying a tape supply reel, a carrier backing or support layer take up reel and a tape compactor unit on a horizontally movable cross member.

Figure 15:
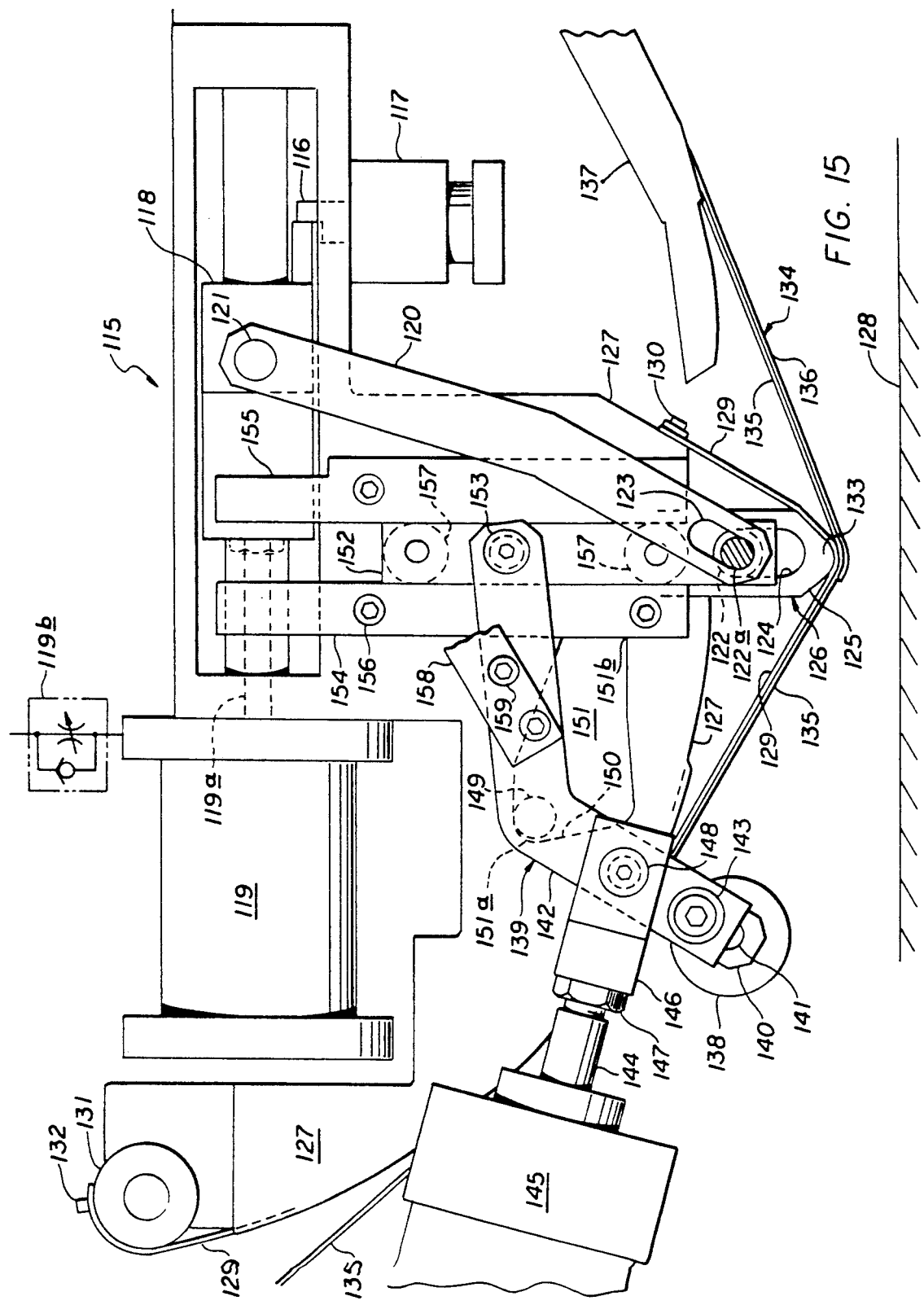
FIG. 15 is a side elevational view of a tape laying and compactor assembly at a null position.

At the beginning of the laying and compaction of a string or strip of composite tape, such as a tape comprising a fibrous reinforcement embedded in a resinous or plastic matrix, the segmented shoe and tail compactor of the tape laying and compactor assembly 115 are in a null position in accordance with FIG. 15. Stop 116 has been raised to its up position by air cylinder 117 and horizontal slider 118 has been moved forward (to the right) against stop 116 by the piston rod 119a of air cylinder 119. With brief reference to FIG. 18, control rod arm 120 is linked to control rod 122 by means of shoulder screw 122a passing through slot 123 in control arm 120. The head of shoulder screw 122a has been removed in FIGS. 15-17, for purposes of clarity. Control rod arm 120, attached to slider 118 by first pivot joint 121, is moved forward, lifting shoulder screw 122a and causing control rod 122 to rise against the upper end of shoe plate slot 124 in segmented shoe plate 125 of segmented shoe array 126 movably supported in housing 127. Shoe plate slot 124 runs through all the plates of segmented shoe array 126, and control rod 122 projects through the shoe plate slot 124 in all of the plates of segmented shoe array 126 composed of a plurality of shoe plates 125. Control rod 122 continues to rise after engaging the upper end of shoe plate slot 124 as slider 118 moves forward to contact stop 116, By the time horizontal slider 118 reaches stop 116, control rod arm 120 will have lifted control rod 122 and hence segmented shoe plate 125 and all the shoe plates of segmented shoe array 126, to a uniform or common predetermined position as the starting point for the laying and compaction of a string or strip of composite tape. The flexible skid member 129, attached at one end to housing 127 by machine screw 130 and at the other end to a spring loaded rotatable retractor wheel or drum 131 by pin 132, follows the upward movement of segmented shoe plate 125 and all the other shoe plates of segmented shoe array 126, through the spring driven rotation of drum 131, so as to maintain contact between flexible skid member 129 and the nose 133 of shoe plate 125 and all the shoe plates of segmented shoe array 126. Composite tape assembly 134, comprising a carrier layer or film 135 and composite tape 136, passing under guide member 137 and under flexible skid member 129 at nose 133 of shoe plate 125, maintains contact with flexible skid member 129 by the rotation of a carrier film take-up reel (not shown) as the shoe plate 125 and all the other shoe plates of segmented shoe array 126 rise under the action of control rod 122. The carrier film 135 passes between housing 127 and tail compaction roller 138 of tail compactor assembly 139 and hence to the take-up reel (not shown). In the null position tail compaction roller 138 does not engage composite tape 136. Tail compaction roller 138 is rotatably supported in block 140 by shaft 141. Block 140 is, in turn, attached to bell crank arm 142 by bolt 143 so that the roller 138 may readily be changed from a full width tape tail compaction roller to a narrower tape tail compaction roller by removing bolt 143 and disengaging block 140 from bell crank arm 142. The tail compactor assembly 139 is moved to and withdrawn from a composite tape tail compaction position by piston rod 144 of air cylinder 145, the cylinder 145 being swingably supported at its opposite end from a clevis joint on the tape laying head (not shown). In the preferred embodiment of the invention, air cylinder 119 is provided with a variable flow control restrictor 119*b*, to govern the speed of its piston rod 119*a* in moving to the right. This helps to ensure that tail compaction roller 138 and its associated support linkage will align with the work surface 128 as air cylinder 145 powers the roller 138 to its advanced position. Piston rod 144 is threadably attached to pivot block 146 and locked with nut 147. Pivot block 146 is pivotally secured to bell crank arm 142 by a second pivot joint 148. Extending piston rod 144 from air cylinder 145 moves tail compaction roller 138 into compaction engagement with the tail of composite tape 136. When at the tail compaction position compaction roller 138 can be disengaged from tape 136 and moved to a stored or retracted position by retracting piston 144. A cam follower 149 is attached to bell crank arm 142 in the manner of the cam follower 96, depicted in FIG. 10. Cam follower 149, rotatably attached to bell crank arm 142, rides on the cam surface 150 of cam slot 151 as the tail compactor assembly 139 is moved into and out of the tail compaction position. The cam slot 151 has diagonally opposed rearward and forward corners 151*a,b*, which serve as respective home and advanced positions for the cam follower 149. Bell crank arm 142 is pivotally attached to vertical slider 152 at third pivot joint 153 and moves vertical slider 152 up and down as the tail compactor assembly 139 moves into and out of tail compaction engagement with the composite tape 136. Vertical slider 152 is slidably held in housing 127 by vertical plates 154 and 155 attached to housing 127 by machine screws 156. To facilitate the vertical movement of vertical slider 152, it is provided with rollers 157. A dog bar 158, attached to bell crank arm 142 by machine screws 159, actuates proximity switches (not shown) to control the movement of tail compactor assembly 139 and segmented shoe array 126 during the operation of the tape laying and compactor assembly 115. It is to be recognized that FIG. 15 shows one side of the tape laying and compactor assembly 115 and that the control rod arm 120, tail compactor assembly with block 140, bell crank 142, cam follower 149, cam slot 151, piston 144, air cylinder 145, clevis 146, vertical slider 152, and vertical plates 154 and 155 are among the elements repeated on the opposite side of the tape laying and compactor assembly. A single shaft 141 and roller 138 extend across the housing 127. Further, it is to be recognized that the control rod 122 extends through the entire segmented shoe array 126 and that the flexible skid 129 and composite tape assembly 134 extend across the entire width of the lower surface, or nose 133 of the segmented shoe array 126.

Figure 16:
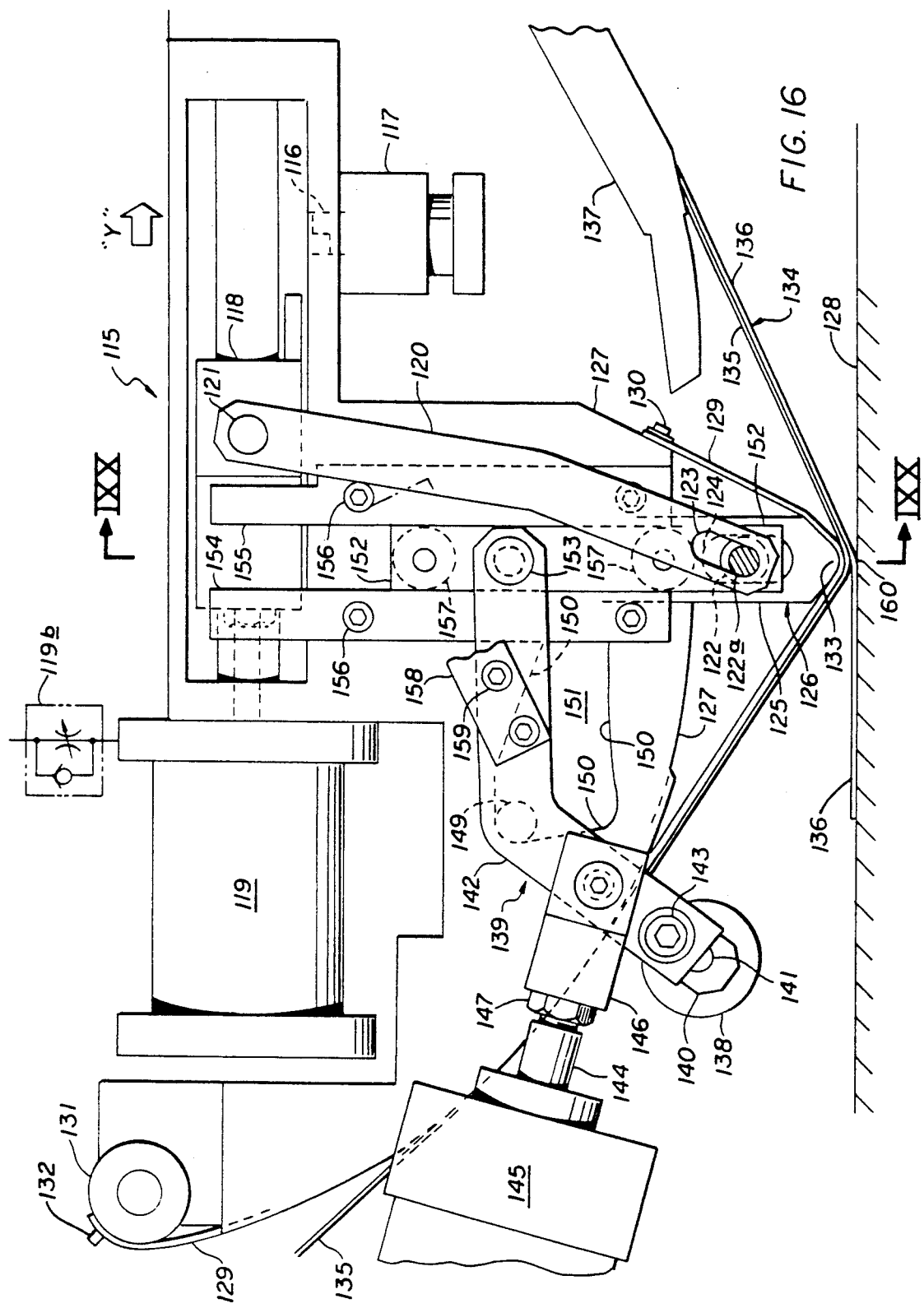
FIG. 16 is a side elevational view of a tape laying and compactor assembly performing a tape laying and compaction operation.

From the null position shown in FIG. 15, the tape laying head compactor assembly 115 is brought to the composite tape laying and compaction position shown in FIG. 16 by the operator and/or a computer program. Stop 116 is brought to a retracted position by air cylinder 117 and horizontal slide 118 is moved to the far left, fully retracted, rearward position by air cylinder 119. As horizontal slider 118 moves to the left, control rod arm 120 is moved to the left, along with horizontal slider 118, and control rod arm slot 123 moves down, thus causing control rod 122 to move down between the ends of shoe plate slot 124 in segmented shoe plate 125, and allowing bladder spring 180 (see FIGS. 18 and 19) to bias segmented shoe plate 125 and all the shoe plates of segmented shoe array 126 downward toward the work surface 128. The downward movement of segmented shoe plate 125 forces the flexible skid member 129 and the composite tape assembly 134 onto the work surface 128. Control rod 122 passes through vertical slider 152 that is pivotally coupled to bell crank arm 142 of the tail compactor assembly 139 at third pivot joint 153. Thus, as control rod 122 moves downward, vertical slider 152 is moved down and tail compactor assembly 139 is brought to a slightly further retracted position from that occupied in the null condition for the tape laying and compaction assembly 115 shown in FIG. 15. The slight retraction of piston 144 into air cylinder 145 accompanies the slight further retraction of tail compactor assembly 139. The control rod 122 is thus positioned in shoe plate slot 124 out of contact with either end of shoe plate slot 124 to permit the vertical movement of segmented shoe plate 125 and all the shoe plates of segmented shoe array 126 up and down with changes in the contour of work surface 128 (see FIG. 19). The upper surface of segmented shoe plate 125 and all of the other shoe plates of segmented shoe array 126 engage a flexible membrane 182 forming the closed side of a bladder spring 180, not shown in FIG. 15 or 16 but described previously herein and also schematically referred to in FIGS. 5*a*, 5*b* and 5*c*, and described in connection with FIG. 18. Additional description of the bladder spring is provided previously herein with reference to FIGS. 9, 12, and 13. The bladder spring 180 biases the segmented shoe plate 125 and all the shoe plates of segmented shoe array 126 downward, toward work surface 128, to provide the compaction force against composite tape 136. Upon engagement of the work surface 128 by composite tape assembly 134, the tape laying and compactor assembly 115 moves toward the right, shown by arrow "Y" along work surface 128, as composite tape assembly 134 is fed to the laydown point 160 on work surface 128 under nose 133 of segmented shoe array 126, and composite tape assembly 134 is pulled from a supply roll (not shown). Immediately after point 160 on work surface 128, carrier layer 135 separates from composite tape 136 and travels between roller 138 and housing 127, against flexible skid 129, toward a take-up reel (not shown).

Composite tape 136 continues to be deposited on work surface 128 as the tape laying and compactor assembly 115 moves to the right until the desired length of tape string or strip is applied to the work surface 128. To obtain the desired length of composite tape 136 applied to work surface 128, a cutter (not shown) cuts composite tape 136 being fed to point 160 without cutting carrier layer 135 forward of point 160. When nose 133 of segmented shoe plate 125 and all the shoe plates of segmented shoe array 126 reaches a predetermined point on the string or strip of composite tape 136 being applied to work surface 128, a switch over from laying and compaction by segmented shoe array 126 to the tail laying and compaction by the compaction roller 138 of tail compactor assembly 139 occurs and the tape laying and compactor assembly 115 is placed in the tail compaction configuration shown in FIG. 17.

Figure 17:
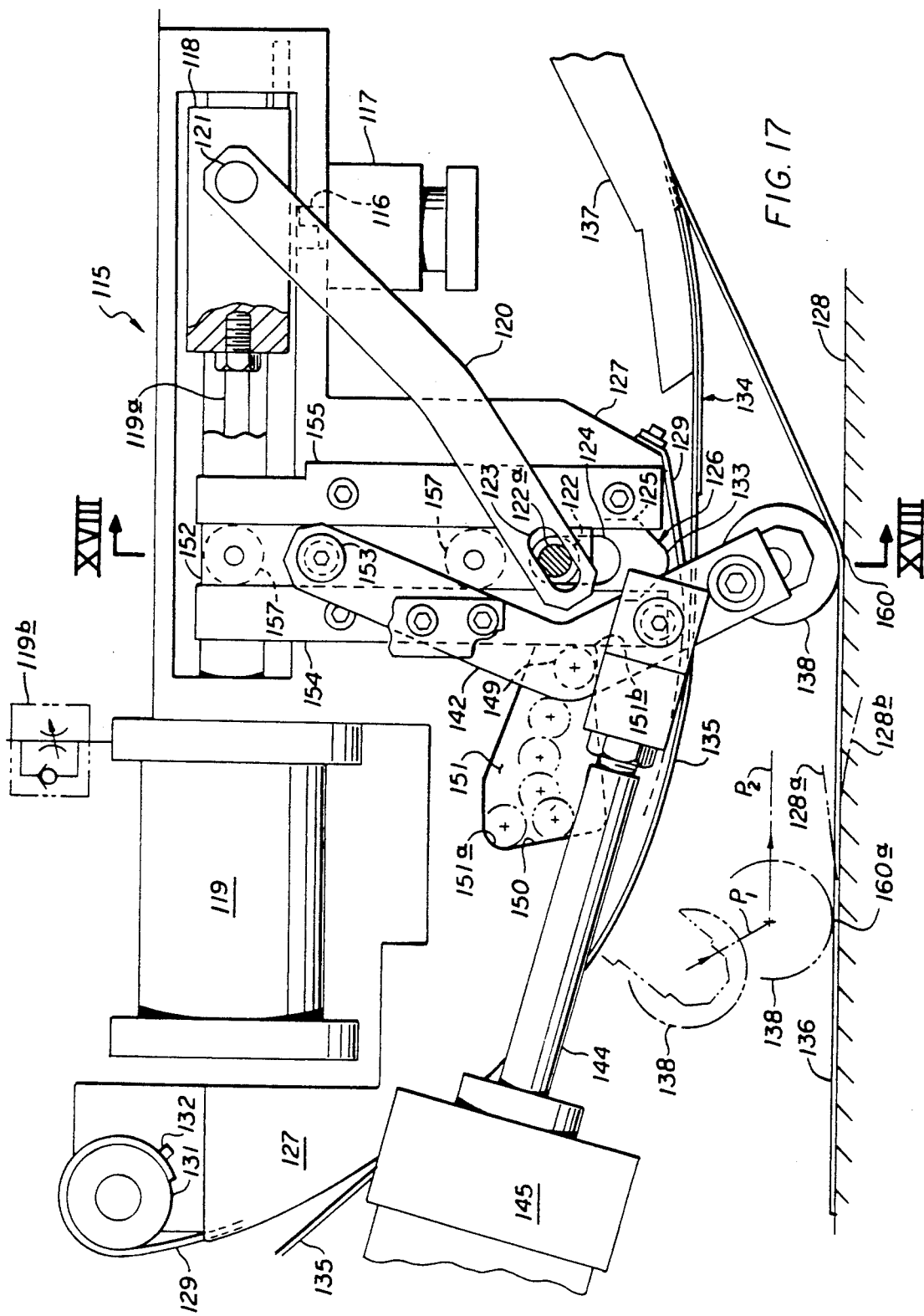
FIG. 17 is a side elevational view of a tape laying head and compactor assembly performing a tail compaction operation.

In changing over from the tape laying and compaction configuration shown in FIG. 16, to the tail laying and compaction configuration shown in FIG. 17, air cylinders 119 and 145 are activated in a coordinated manner such that segmented shoe plate 125 and all the shoe plates of segmented shoe array 126 are progressively retracted into housing 127 as tail compaction roller 138 is lowered into contact with and compacts the tail of the string or strip of composite tape 136. The firing of air cylinder 119 moves horizontal slider 118 from a retracted position at the left side, to a fully extended position on the right side with reference to FIG. 17. The movement of horizontal slider 118 carries control rod arm 120, attached thereto at first pivot joint 121, to the right, to cause the bottom end of control rod arm slot 123 in control rod arm 120 to raise control rod 122 against the upper end of shoe plate slot 124 in segmented shoe plate 125 and all the shoe plates of segmented shoe array 126. At this point, the air cylinder 145 has initiated the extension of piston rod 144, and hence the pivoting movement of the tail compactor assembly 139 and tail compaction roller 138 about pivot joint 153, toward a tail compaction position, into contact with composite tape 126 on work surface 128. After contacting the tape on work surface 128, further movement of the roller 138 towards point 160 causes the bell crank arm 142 to drive vertical slider 152, and pivot joint 153 upward. This upward movement of vertical slider 152 raises control rod 122, passing through vertical slider 152 and contacting the upper end of shoe plate slot 124, to progressively raise shoe plate 125 and all the shoe plates of segmented shoe array 125, thereby causing segmented shoe plate 125 and all the shoe plates of segmented shoe array 126 to be retracted into housing 127. This retraction of segmented shoe plate 125 and all the shoe plates of segmented shoe array 126 raises nose 133 from compaction engagement with composite tape assembly 134 so that compaction roller 138 can engage only composite tape 136 of the composite tape assembly 134, to compact the tail of the string or strip of composite tape 136 all the way up to point 160 on work surface 128. As air cylinder 119 begins to move horizontal slider 118 to the right, air cylinder 145 is activated and piston 144, connected to bell crank arm 142 by pivot block 146, at pivot joint 148, moves tail compactor assembly 139 about third pivot joint 153, to move tail compaction roller 138 through first path $P_1$ and into contact with composite tape 136. As tail compactor roller 138 moves about third pivot joint 153, cam follower 149, rotatably connected to bell crank arm 142, leaves its home position and follows cam surface 150 of cam slot 151. This defines the path traveled by tail compaction roller 138 in moving through air from a retracted position (FIG. 16), to the tape engagement position. The compaction roller 138 engages composite tape 136 on work surface 128 at point 160a substantially rearward of point 160 on work surface 128. The roller 138 then moves along a path $P_2$ in accordance with and parallel to work surface 128, to point 160. When roller 138 moves along its path $P_2$, cam follower 149 leaves cam surface 150 and moves across cam slot 151, finally coming to rest at forward corner 151b. Here it should be noted that, while the invention is certainly well-suited for the flat surface depicted in FIG. 17, clearance of slot 151 around cam follower 149 permits roller 138 to ride on different surface contours 128a,b, in moving from point 160a to point 160. The particular point 160a at which compaction roller 138 engages and begins to compact the tail of the string or strip of composite tape 136 on work surface 128, rearward of point 160, can be set by the configuration of cam slot 151 in conjunction with the shape of bell crank arm 142. In a particular practice of this invention, compaction roller 138 would engage and begin to compact the tail of the string or strip of composite tape rearward of point 160, e.g., 4 inches.

The movements of horizontal slider 118 and tail compactor assembly 139 when bringing compaction roller 138 into compaction engagement with the tail of the string or strip of composite tape 136 are coordinated mechanically and pneumatically so as to cause the segmented shoe array 126 to begin to retract into housing 127 at the time the compaction roller 138 initiates the compaction of the tail of the string or strip of composite tape 136 and then to cause segmented shoe array 126 to progressively retract into housing 127 as compaction roller 138 moves along the surface of work surface 128 to point 160, at which time the segmented shoe array has been retracted into housing 127 sufficiently to permit compaction roller 138 to reach point 160 on work surface 128 without compaction roller 138 contacting composite tape assembly 134, flexible membrane 129 and nose 133 of the segmented shoe array 126. There is, however, in accordance with a practice of this invention, a point in time when tail compaction roller 138 engages the tail of the string or strip of composite tape 136 and, simultaneously, nose 133 of segmented shoe array 126 presses composite tape assembly 134 against work surface 128. This condition exists for only a short period of time and assists in preventing defect producing movement of the string or strip of composite tape 136 when going from the tape laying and compaction mode to the tail compaction mode (i.e., going from the tape laying and compactor assembly 115 conformation in FIG. 16 to the tape laying and compactor assembly 115 conformation in FIG. 17). The compaction force of compaction roller 138 on the tail of the string or strip of composite tape 136 is achieved by use of the bladder spring previously disclosed herein and not shown in FIG. 17.

With reference to FIG. 18 the tape laying and compactor assembly 115 according to the invention has a bladder spring 180 formed by chamber roof member 181 and flexible membrane 182 locked between chamber roof member 181 and a clamping member 184 by screws 185 to form a chamber 183 into which a fluid (i.e., air) can be introduced at orifice 186. The flexible membrane 182 seals the chamber 183 and engages the top of segmented shoe array 126 continuously, thereby following or producing the vertical movement of the shoe plates of segmented shoe array 126. Compressed air introduced into chamber 183 presses against the flexible membrane 182, thereby biasing the shoe plates of segmented shoe array 126 downward. In FIG. 18 the shoe plates of segmented shoe array 126 are contacted by flexible membrane 182 and biased downward against control rod 122 which is positioned against the upper end of shoe plate slot 124 in a manner previously described herein. Control rod 122 runs through, and is held in, vertical slider 152 that is, in turn, attached to bell crank arm 142 at third pivot joint 153. Thus, the downward biasing force against the shoe plates of segmented shoe array 126, by flexible membrane 182, is transmitted to control rod 122, thence to vertical slider 152 and then to bell crank arm 142. The downward biasing force that has been transferred to bell crank arm 142 is transmitted by bell crank arm 142 to block 140 attached to bell crank arm 142 by bolt 143 which then transfers the downward biasing force to shaft 141 held in block 140 and hence to tail compacting roller 138, mounted on shaft 141, that engages the tail of the string or strip of composite tape 136 on work surface 128 and thereby applies compaction force on the tail of composite tape 136. It is to be recognized that the air pressure in chamber 183 of bladder spring 180 may be adjusted to provide a constant preset compaction force on the tail of the string or strip of composite tape 136 by tail compaction roller 138 or a controlled variation in the compaction force exerted by tail compaction roller 138. The adjustment and control of air pressure in the bladder spring 180 may be achieved by an air valve and method previously described herein. Such adjustment of air pressure in bladder spring 180 may be employed in either or both the tape laying and compaction and the tail compaction operations for applying composite tape 136 to work surface 128 to produce a plastic article. A sensor may be employed to measure the air pressure in the chamber and provide a signal to control such air pressure by adding air to or removing air from chamber 180. FIG. 18 presents, in partial section, an end position of the width of tape laying and compactor assembly 115 taken along line 18—18 of FIG. 17. It is to be recognized that the portion shown in FIG. 18 is in all its essential features duplicated at the opposite end of the width of tape laying and compactor assembly 115 in agreement with previous disclosures herein (see FIGS. 7 and 8).

The vertical sliders 152, bell crank arms 142, and control rod arms 120 are manufactured with small amounts of side clearances, e.g., 0.005" (.0.13mm), and the pivot joints 121, 148, 153 are provided with small diametrical clearances, e.g., .0.0005" (.0.013mm). The link-supported tail compaction roller 138 may therefore tilt slightly, from side-to-side with respect to the housing 127, to align with surface contour changes occurring across the width of the tape tail. This tilt is uniquely accommodated by the cooperative compliance of the bladder spring 180 acting on the control rod 122, and the side air cylinders 145 acting on the bell crank arms 142.

Thus, while the invention has been shown in connection with a preferred embodiment, it is not intended that the invention be so limited. Rather the invention extends to all such designs and modifications as come within the scope of the appended claims.

What is claimed is:

1. An improved machine for laying plastic tape on a work surface to produce a plastic article comprising:
   a base structure located in a predetermined tape laying position relative to the work surface; and
   a tape laying head means movably mounted on the base structure for applying the tape to the work surface, said head means comprising:
   a frame; and
   a presser member means movably affixable to said frame, said presser member means comprising:
   a presser member housing affixable to the frame;
   means for affixing the housing to the frame;
   a presser shoe member movably supported in the housing and having a tape presser face extendable from said housing and a biasing portion extending into the housing and said shoe having a vertical centerline;
   a bladder spring means in said housing for yieldably biasing the tape presser face of said shoe member away from the housing including a fluid chamber having a flexible membrane enclosing said chamber and extending into contact with the biasing portion of the shoe member;
   a tape compaction means adjacent said presser shoe member movable to and from compaction engagement with the tape; and
   means for directing and controlling the movement of said head; wherein the improvement comprises:
   means for applying bladder spring biasing force to the tape compaction means for compacting tape onto the work surface;
   means for controlling the bladder spring biasing force applied to the tape compaction means; and
   means for moving the tape compaction means to and from engagement with the tape independently of and coordinated with the vertical movement of the presser shoe member to and from a tape depositing position on the work surface, said engagement of the tape by the tape compaction means first occurring at a point significantly rearward of the centerline of said presser shoe member and hence to a point substantially coincident with the intersection of said centerline with the tape applied to the work surface upon retraction of the presser shoe member from the work surface.

2. A machine according to claim 1 wherein the presser shoe member comprises a plurality of wafer-like plate segments having flat parallel opposite faces stacked in face-to-face array and movably supported in the housing; said segments having a tape presser face extending from said housing and said segments each having a biasing portion extending into said housing.

3. A machine according to claim 1 further comprising a sensor means coupled to the bladder spring for sensing and measuring the fluid pressure therein and producing a signal in relation to the fluid pressure.

4. A machine according to claim 1 wherein the tape compaction means includes a roller member for compaction engagement with the tape.

5. A machine according to claim 1 wherein the means for moving the tape compaction means to and from engagement with the tape includes a cam means associated with the housing for controlling movement of the tape compaction means; and a cam follower coupled to said tape compaction means and engaging said cam means.

6. A machine according to claim 1 further comprising a means for aligning said tape compaction means with contour changes occurring across the tape width.

7. A machine according to claim 2 further comprising a means for coupling the tape compaction means to said presser shoe member for coordinated movement of said means and said member into and out of tape laying and compaction engagement with the tape.

8. A machine according to claim 2 further comprising a means for aligning said tape compaction means with contour changes occurring across the tape width.

9. An improved tape laying machine having a tape head movable along a horizontal path for depositing composite tape on a work surface, wherein the head includes an assembly of tape on a backing transported to a tape laydown point, at which point the tape is pressed to the surface and the backing is separated from the tape, and wherein the head also includes shoe means movable with respect to the head and means for causing the backing to follow shoe means movement, the improvement comprising:

a horizontal reference plane defined on the work surface;

a housing, mounted to said tape laying head, and movable therewith along said reference plane;

a first slider, movably mounted to a vertical track on said housing;

a second slider, movably mounted to a horizontal track on said housing;

means for moving said second slider in forward and reverse directions;

shoe means movably mounted on said housing and having a substantially vertical centerline, for pressing against said backing at a tape laydown point defined on said horizontal reference plane;

means for biasing said shoe means against said backing;

a first elongate link, having opposite ends, and pivotally connected at one end to said first slider about a horizontal pivot axis;

a tail compaction roller, rotatably journalled at the other end of said first elongate link, about a horizontal roller axis and positioned between said backing and said tape;

a second elongate link, having opposite ends, and pivotally connected at one end to said second slider about a horizontal pivot axis;

means for pivotally connecting the other end of said second elongate link to said first elongate link about a horizontal pivot axis;

cam means on said housing for controlling at least a portion of movement of said tail compaction roller;

cam follower means on said first elongate link for contacting said cam means during said portion of movement of said tail compaction roller;

lifting means engaging said first slider for lifting said shoe means against said biasing means; and means coupled to said first elongate link for moving said roller into and out of engagement with the tape;

wherein the pivot axes and the roller axis are parallel to one another; and wherein the means coupled to said first elongate link produces motion of said link to raise and lower said first slider and said motion, raising said first slider, causes said lifting means to engage the shoe means for lifting said shoe means as said roller moves along a path having a horizontal component of movement toward the vertical centerline; and wherein, as the second slider continues movement in the direction away from said means for moving said second slider, the first slider will continue to move upwardly, in a coordinated manner, thereby causing the lifting means to lift said shoe means, while the backing follows the shoe means, and the tail compaction roller will move forward into contact with the tape at the tape laydown point.

10. A machine according to claim 9 further comprising a means for aligning said tape compaction roller with contour changes occurring across the tape width.

11. A machine according to claim 9 wherein said shoe means comprises a plurality of wafer like plate segments having a flat parallel opposite faces stacking in face-to-face array, said segments having a tape presser face and a biasing portion.

12. A machine according to claim 11 further comprising a means for aligning said tape compaction roller with contour changes occurring across the tape width.

* * * * *